United States Patent [19]

Clingerman et al.

[11] 3,850,382

[45] Nov. 26, 1974

[54] SEMIAUTOMATIC FILE REEL HUB

[75] Inventors: Richard Grant Clingerman; O. Roger McAllister, both of Oklahoma City, Okla.

[73] Assignee: Honeywell Information Systems Inc., Waltham, Mass.

[22] Filed: Sept. 28, 1972

[21] Appl. No.: 293,214

[52] U.S. Cl. .......... 242/68.3
[51] Int. Cl. .......... B65h 19/02
[58] Field of Search .......... 242/68.3, 72.1

[56] References Cited

UNITED STATES PATENTS

| | | | |
|---|---|---|---|
| 2,614,761 | 10/1952 | Camras | 242/68.3 X |
| 3,124,319 | 3/1964 | Cohen et al. | 242/68.3 |
| 3,154,262 | 10/1964 | Cohen et al. | 242/68.3 |
| 3,307,797 | 3/1967 | McFeathers et al. | 242/68.3 |
| 3,690,581 | 9/1972 | Wainio | 242/68.3 |
| 3,708,136 | 1/1973 | Cope et al. | 242/68.3 |

*Primary Examiner*—Donald E. Watkins
*Assistant Examiner*—John M. Jillions
*Attorney, Agent, or Firm*—Edwin H. Crabtree

[57] ABSTRACT

A mounting hub for magnetic tape reels is disclosed which enables semiautomatic mounting of reels onto tape transports. A set of evenly spaced clamps and a set of collets are provided to securely clamp reels against a hub flange and center the reels relative to the hub axis. A spring driven cam, generally conical in shape, first drives the clamps into a fixed reel clamping position and then, after further cam advance, biases the collets outwardly, thereby providing a reel centering force and additional clamping force. Buttons, spring mounted to the hub, loosely position reels when initially mounted. Withdrawal of a push rod upon activation of a "LOAD" switch enables the spring loaded cam to advance.

8 Claims, 4 Drawing Figures

PATENTED NOV 26 1974

3,850,382

SEMIAUTOMATIC FILE REEL HUB

Field of the Invention

The present invention relates generally to apparatus for handling magnetic tape reels, and more particularly to a new and improved reel mount which is effective to retain a reel in driving engagement and in proper alignment, which is particularly useful for electronic digital computer systems and similarly demanding applications.

DESCRIPTION OF THE PRIOR ART

In present day magnetic tape transports used with computers, it is common practice to have tape reels which are removable such that different computer programs and other information may be preserved in a library of tapes or in a set of tapes provided by a computer user. These reels are generally stored in racks from which they are removed by the computer operator during operation of the computer, when the particular information is required. A computer operator, in most instances, is called upon to remove tapes from the supply reel hubs (called the file reel hubs by convention) and deposit new tapes on the hubs, preferably with a minimum lapse of time and with a minimum of operator effort. However, setting up tape configurations requires time measured in seconds or minutes as opposed to the computer system's operations which may be measured in nanoseconds. It is obvious that saving operator reel mounting time and effort is very important for real computer system efficiency.

It is further well known that the operation of a high speed tape transport imposes relatively severe requirements on the capabilities of a reel mount to hold the tape reel in place. Both rapid acceleration and deceleration of the tape reel occur when a tape reel is brought up to speed from a dead stop, or when it is brought to a rapid halt. These accelerations and decelerations are extremely large when a reversal in the direction of reel rotation is called for. Of prime importance, therefore, is the capability of the reel mount to hold the tape reel securely in position during operation of the tape transport, in addition to the aforementioned requirement for ease of removal and mounting of tape reels by the operator. A representative requirement is that the hub must clamp the reel with sufficient force to prevent any relative motion between the hub and reel when 60 inch-lbs. torque is applied to the hub. Furthermore, in addition to the above requirements demanded of a reel hub when used in a high speed tape transport, there is yet another requirement, that of aligning the reel on the mounting hub such that, when the reel is placed in its operative position and tape movement started, the reel is concentrically mounted relative to the hub and reel wobble is avoided. If this is not achieved, vibrations will result, which will make proper tape transport operation impossible and/or cause excessive transport and/or tape wear.

While seeking a solution to these problems, it was found that a semiautomatic mode of operation was desirable for improving system efficiency. With conventional manual operation, a reel loading process includes sliding a reel onto the hub, which generally requires the use of both hands, a manual reel latching operation, and then the actuation of the "LOAD" switch. Due to variations in dimensions of tape reels it is difficult to assure positive centering of reels. Because of these variations, the linkage is made with a tight fitting latched position in which a resilient material between the collets and the tape reel is compressed, This results in a requirement for high manual forces to latch the reels. However, even with this arrangement, an occasional reel will not be properly gripped and centered. It has been found desirable to eliminate manual latching while improving the reel gripping and centering functions. These factors imply the use of a powerful actuator and a frictionless connection to rotating hub portions. Accordingly, semiautomatic operation tends to make it even more difficult to provide an improved reel hub gripping mechanism.

It is therefore an object of the present invention to provide a file reel hub which facilitates loading and unloading of a tape reel into a tape transport system.

A further object of the invention is to provide a reel hub having a mechanically induced force applied to the reel for gripping the reel onto the hub, which force is induced and maintained by a simple mechanism.

Yet another object of the invention is to provide a reel hub wherein a reel is both firmly gripped on the hub for rotation thereby and concentrically aligned on the hub with minimum operator effort.

Another object of the invention is to provide a reel hub which has semiautomatic reel latching.

SUMMARY OF THE INVENTION

A hub assembly for tape reels is provided which semiautomatically mounts reels. Button spring elements, in conjunction with a flange on the hub assembly, loosely position a reel which has been slipped onto the hub, over the button spring elements. When the next tape loading step is performed, normally by manually actuating the "LOAD" button (or remotely and automatically under program control), a spring is released which causes the reel to be firmly clasped against a hub flange and accurately centered. The spring drives a cam which first wedges a set of clamp elements, having elastomeric tips, firmly against a side of the reel, so that subsequent reel wobble is avoided. The cam then wedges a set of collets outwardly, which causes a rubber ring to expand, thereby firmly centering the reel and gripping it so that reel can withstand the large torques imposed by high performance tape transports. The cam surface which wedges the collets outwardly has a continuous small slope whereby the wedging force is continuous. Also, the use of spring loading on the cam obviates any need for a frictionless joint between the hub and the actuator or the need to rotate the hub and actuator as a unit.

BRIEF DESCRIPTION OF A PREFERRED EMBODIMENT OF THE INVENTION

Figure 1:
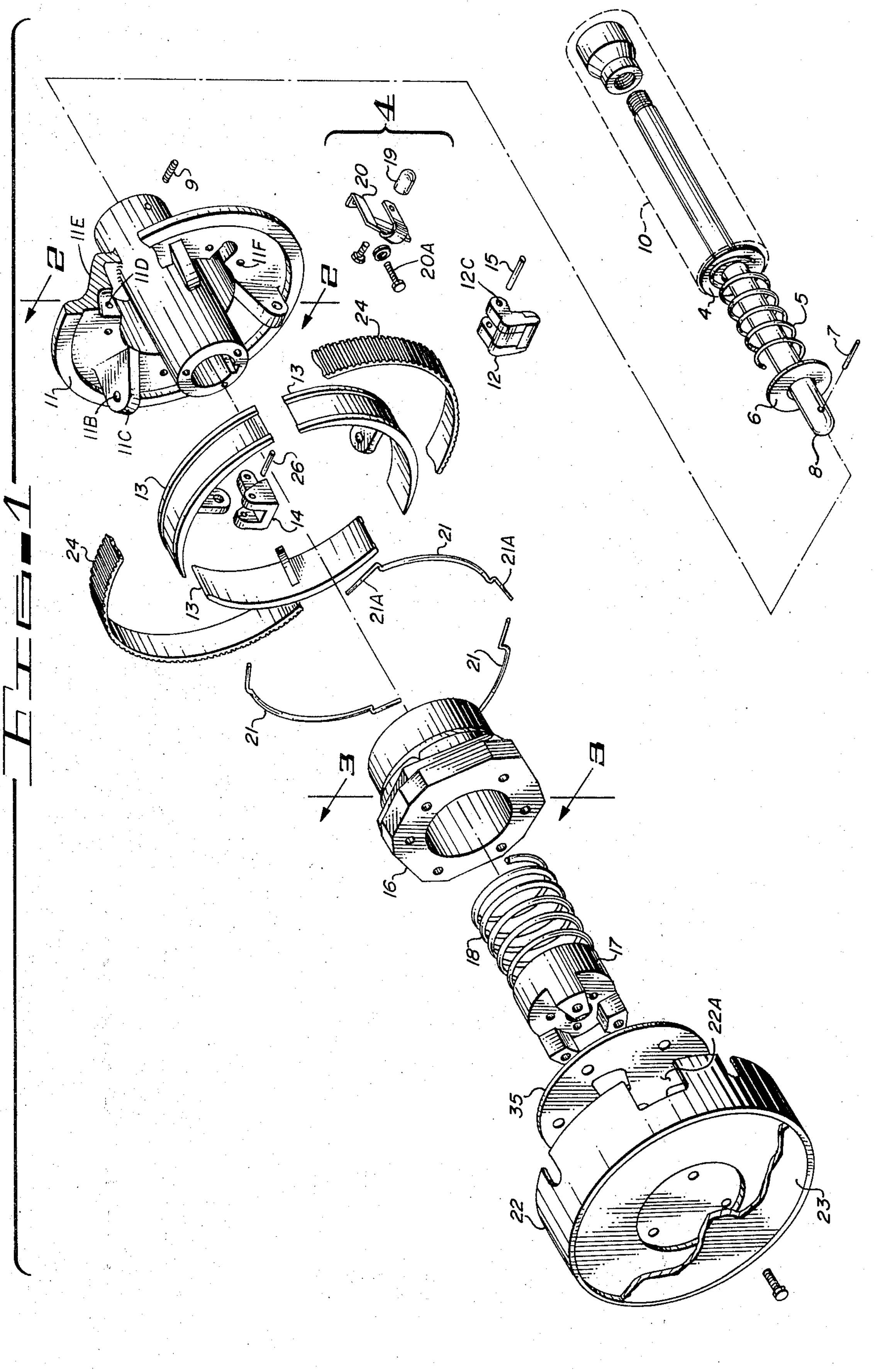
FIG. 1 is an exploded view, in perspective, of a preferred embodiment of the invention.
Figure 2:
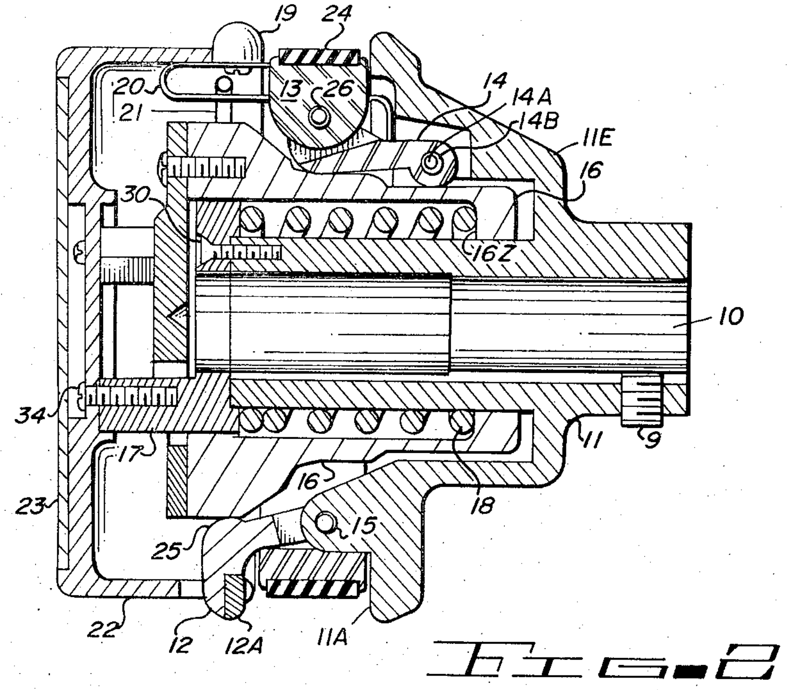
FIG. 2 is a side elevation view in section of the hub assembly.
Figure 4:
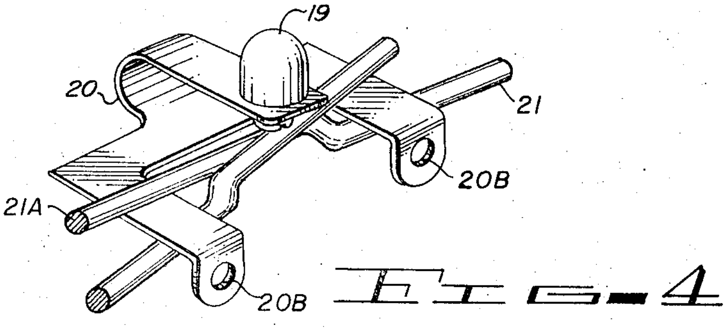
FIG. 4 is an enlarged view of a button element.

FIG. 2 shows the hub assembly in the reel engaging position. A hub base 11 is fixed to the concentric hollow tape transport drive shaft 10 by the set screw 9 and is also concentric with a push rod 8 (FIG. 1). Washer 4, seated against the end of motor shaft 10, spring 5 and washer 6, resting against pin 7, through push rod 8, bias the push rod against plate 35 to insure that there is no contact between the push rod and the actuator when motor shaft 10 is rotating. A mounted reel rests against the flat surface on the flange of hub base 11 and is driven by a band of resilient material 24, such as rubber, which is pressed by collets 13 against the inner reel bearing surface. The cam 16 is the essential element for selectively engaging the reel with the hub for reel drive. Retainer element 17 serves as a spring retainer and hub cover holder. It is fixed to hub base 11 by three evenly spaced bolts. Retainer element 17 retains one end of helical spring 18, the other end of which engages a flange portion 16Z of cam 16 that is thereby driven to the right. Hub cover 22 is attached to retainer element 17 by three evenly spaced bolts and faceplate 23 is held by adhesive in the indented front of hub cover 22. Three reel clamps 12 are coupled to hub base 11 by pivot pins 15 which extend through aligned openings 12*e* in reel clamps 12 and through matching openings 11*b* in lugs 11*c* protruding from hub base 11. Reel clamps 12 are biased rapidally inward by springs 21 (FIG. 1). Each clamp has a surface portion which engages cam 16 and has an elastomeric tip insert 12A which resiliently presses a reel against the flange surface of hub base 11. Cam 16 also drives the collets 13 radially outwardly by means of the intermediate links 14 which have respective pivot pins on hub base 11 and pivot pins 26 on the collets. Pins 14*a* connecting links 14 to hub base 11 extend through openings 14*b* in links 14 and openings 11*d* in ribs 11*e* projecting from the rear of hub base 11. Loose reel positioning means are provided by buttons 19 which are connected by respective leaf springs 20 of the hub base 11 (FIG. 4). Bolts 20*a* extend through openings 20*b* in leaf springs 20 into sockets 11*f* in hub base 11.

Springs 21 are held in place by threading end portions 21*a* through adjacent leaf springs 20 in a manner shown in detail in FIG. 4. As mentioned above, leaf springs 20 are attached to hub base 11 at sockets 11*f*. is seated in a in the clamping member 12 spanned by the spring 21. The notch 12*b* is illustrated in. Each spring 21 exerts a force on the clamping member 12 which draws the member 12 radially inward. The clamping member 12 is biased outwardly against this force upon movement of cam 16.

In addition to loosely positioning the reels, the buttons 19 serve to provide a detent action which enables the operator to "feel" when the reel is properly positioned on the hub. In installations where the hub may be unloaded remotely under program control, the buttons will retain the reel in the proper position for reloading. Also, in case of a malfunction which might allow the hub to rotate in the unloaded position with a reel in place, the buttons will keep the reel from falling off the hub.

Figure 3:
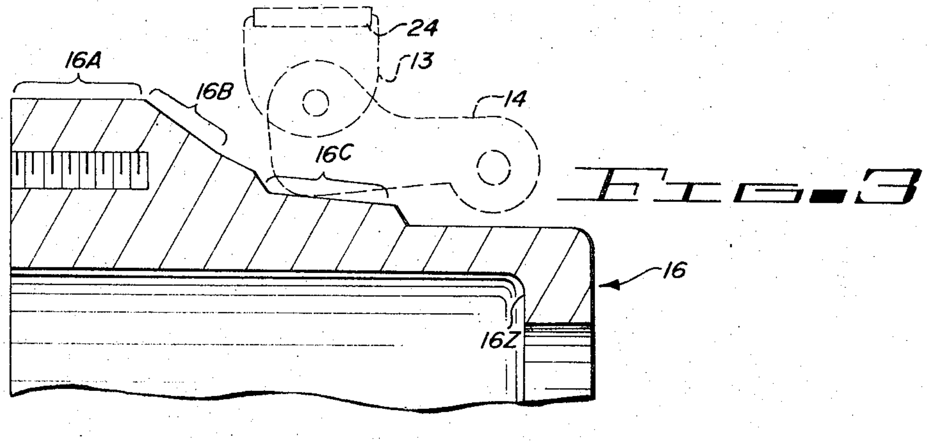
FIG. 3 is an enlarged sectional view of the cam element.

Disengagement of the hub from a mounted reel is described as follows. The push rod 8, inside the drive shaft 10, is moved to the left, as seen in FIG. 1, by an actuator. Push rod 8 pushes drive plate 35, causing cam 16 to move left against helical spring 18. As cam 16 moves left, collets 13 retract as the links 14 move inwardly, under the pressure of the rubber ring 24 and the narrowing slope 16C (FIG. 3) of cam 16. As the push rod 8 moves farther to the left, clamps 12 retract under the force of springs 21 as the clamp surface slides from the flat portion 16A on cam 16 to the narrowing slope portion 16B. The hub assembly is then unlocked, enabling removal of a mounted reel and replacement by another reel.

To mount a reel, it is sufficient to slip the reel's central opening over the outside diameter of hub cover 22, past buttons 19, and over the rubber ring 24. The reel is then held loosely between the buttons 19 and the hub flange. When the next control step is performed, normally by actuating a "LOAD" button (or remotely by program control), an actuator withdraws the push rod 8, allowing helical spring 18 to move the cam 16 to the right. As cam 16 moves right, clamps 12 move up the ramp portion 16B of the cam and emerge from the recesses 22A in hub cover 22 and resiliently hold the reel from wobbling under the grip of elastomeric inserts 12A which clamp the reel against the hub flange 11A, when the clamp rides on cam surface portion 16A. Helical spring 18 drives the cam 16 farther to the right and the cam surface 16C forces the links 14 and their collets 13 outward and the rubber ring 24 expands. This action tends to accurately center the reel relative to the bore of the hub assembly and tends to increase the hub mount's resistance to torque.

It should be noted that the absolute tolerances on hub assembly parts are liberal although the tape tranpsort requires that reels be accurately centered. Furthermore, the reel is automatically engaged by the clamps and the rubber ring expanded by the collets with the force of only a moderately strong spring. The use of elastomeric tips on the reel clamps allows for both variations in the clamp linkage and for movement of the reel in a plane perpendicular to the hub axis which centers the reel in response to the expansion of collets 13 and the rubber ring 24. As long as the relative dimensions of the expansion linkage are uniform the reel centering will be accurate. A uniform shape of the ramp surface portion 16C of the generally conical cam 16 is sufficient. Because the ramp surface portion 16C extends above and below the nominal reel centered position, the absolute dimension of this linkage is not critical. In addition, this linkage provides a continuous centering force when the reel is rotated. Also, because the slope of surface portion 16C is small, there is a large mechanical advantage and the wedging action is very positive. This wedging action is independent of the clamps 12 because the clamps are resting on a cylindrical surface portion 16A and offer no resistance to axial movement of cam 16. Furthermore, the use of a spring element to drive the hub engaging mechanism obviates the need for a frictionless connection. The reel is only disengaged when it is stopped so that push rod 8 operates to disengage the reel only when there is no relative motion.

It is understood that the invention should not be construed as being limited to the form of embodiment described and shown herein as many modifications may be made by those skilled in the art without departing from the scope of the invention.

What is claimed is:

1. A hub assembly for a tape transport mechanism on which reels are automatically loaded, comprising:

A. a hub base, adapted to be fixed on a tape drive shaft, and having a flange portion for engaging one side of a reel;

B. clamp elements, pivotally mounted on said hub base, for selectively engaging the other side of a tape reel and press the tape reel against said flange portion;
C. collets, movably mounted on said hub base, for radial movement towards a reel engaging position;
D. a cam, slidably mounted coaxially with said hub base, having surface portions adapted to selectively drive said clamp elements and said collets into reel engaging positions;
E. a spring element, between said hub base and said cam, for driving said cam in a direction such that said clamp elements and said collets engage a mounted reel.

2. The hub assembly of claim 1 further comprising:

F. a push rod arranged to selectively shift said cam to reel disengaging position.

3. The hub assembly of claim 1 further comprising:

F. a hub cover, mounted on said hub base, for guiding a tape reel for mounting.

4. The hub assembly of claim 1 further comprising:

F. button elements, attached by springs to said hub base, for loosely positioning a reel mounted on the hub assembly.

5. The hub assembly of claim 1 further comprising:

E. said cam having a generally conical shape such that a section perpendicular to its axis is circular or forms a regular polygon.

6. A hub mounting mechanism for automatically engaging a tape reel comprising:

A. a hub base, adapted for mounting on a drive shaft, and having a flange for engaging the side of a reel;

B. clamps pivoted on said hub base so as to be engageable with the opposite side of a mounted reel;

C. collets pivotally mounted on said hub base for movement radially outward;
D. a resilient ring extending around said collets for gripping a tape reel;
E. a cover, fixed to said hub base, for providing a reel mounting guide;
F. a set of buttons, spring mounted on said hub base to protrude through said cover, for loosely holding a tape reel against said hub base flange;
G. a conical cam, mounted coaxially on said hub base, having a cylindrical surface portion which holds said clamps against the side of a tape reel and having a sloped surface portion for wedging said collets outwardly;
H. a spring, intermediate said hub base and said cam, for biasing said cam to provide a collet wedging action.

7. The hub mounting mechanism of claim 6 further comprising:

I. a push rod, concentric with said hub base, for selectively shifting said cam to a reel disengaging position.

8. A hub mounting mechanism as in claim 6 wherein said conical cam has circular or regular polygonal cross sections along its axis and wherein said cylindrical or regular polygonal surface portion and said sloped surface portion are spaced.

* * * * *